(12) United States Patent
Delayre et al.

(10) Patent No.: US 9,855,792 B2
(45) Date of Patent: *Jan. 2, 2018

(54) AIRCRAFT WHEEL COMPRISING A DUCT ESTABLISHING A LEAKAGE PATH IN THE WHEEL

(71) Applicant: MESSIER-BUGATTI-DOWTY, Velizy Villacoublay (FR)

(72) Inventors: Xavier Delayre, Velizy-Villacoublay (FR); Yohann Mazan, Velizy-Villacoublay (FR)

(73) Assignee: MESSIER-BUGATTI-DOWTY, Velizy-Villacoublay (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/399,185

(22) Filed: Jan. 5, 2017

(65) Prior Publication Data

US 2017/0113486 A1 Apr. 27, 2017

Related U.S. Application Data

(62) Division of application No. 14/640,278, filed on Mar. 6, 2015, now Pat. No. 9,630,448.

(30) Foreign Application Priority Data

Mar. 28, 2014 (FR) ...................... 14 52738

(51) Int. Cl.
  *B60B 25/00* (2006.01)
  *B60B 25/22* (2006.01)
(52) U.S. Cl.
  CPC ............ *B60B 25/002* (2013.01); *B60B 25/22* (2013.01); *B60B 2900/5116* (2013.01); *B60Y 2200/51* (2013.01)

(58) Field of Classification Search
  CPC ....... B60B 25/006; B60B 21/04; B60B 25/04; B60B 25/00; B60B 7/08; B60B 25/22;
  (Continued)

(56) References Cited

U.S. PATENT DOCUMENTS 532,420 A  1/1895  Gilliam
2,552,082 A  5/1951  Ash
(Continued)

FOREIGN PATENT DOCUMENTS

DE  20 2012 101 252 U1  8/2013
GB       890959 A       3/1962
WO     98/30403 A1      7/1998

OTHER PUBLICATIONS

International Search Report of FR 1452738, dated Nov. 18, 2014. [PCT/FR/210].

(Continued)

*Primary Examiner* — S. Joseph Morano
*Assistant Examiner* — Jean Charleston
(74) *Attorney, Agent, or Firm* — Sughrue Mion, PLLC

(57) ABSTRACT

The invention relates to an aircraft wheel comprising a rim and a tire (20) received on the rim, the rim comprising two parts (1; 2) assembled with one another by means of assembly bolts (5), one of the parts comprising a recess (3) in which is arranged a seal (4) which is interposed between the two parts, the wheel being characterized in that at least one of the parts comprises at least one duct (6) extending beneath the seal so as to establish a leakage path between on one hand a volume of gas delimited by the rim and the tire, and on the other hand a space between the parts, the path being nominally closed by the seal when the bolts are tightened correctly but allowing gas to leak from said volume when the bolt associated with said opening is not tightened correctly or is absent.

4 Claims, 3 Drawing Sheets

(58) Field of Classification Search
CPC ............ B60B 2900/5116; B60B 3/087; B60Y 2200/51
USPC ................ 301/10.1, 11.1, 11.2, 11.3, 95.101
See application file for complete search history.

(56) References Cited

U.S. PATENT DOCUMENTS

| | | | | |
|---|---|---|---|---|
| 2,990,216 | A * | 6/1961 | Albright | ................ B60B 3/007 |
| | | | | 301/6.1 |
| 5,000,241 | A * | 3/1991 | Patecell | ................ B60B 21/12 |
| | | | | 152/381.5 |
| 5,215,137 | A * | 6/1993 | Weeks | ................ B60B 25/22 |
| | | | | 152/379.4 |
| 7,779,877 | B2 * | 8/2010 | Putz | ................ B60B 3/16 |
| | | | | 152/396 |
| 2011/0057503 | A1 * | 3/2011 | Marsaly | ................ B60B 25/22 |
| | | | | 301/95.11 |
| 2011/0221261 | A1 * | 9/2011 | Eaton | ................ B60C 23/003 |
| | | | | 301/5.24 |

OTHER PUBLICATIONS

French Written Opinion of FR 1452738, dated Mar. 28, 2014. [PCT/FR/237].

* cited by examiner

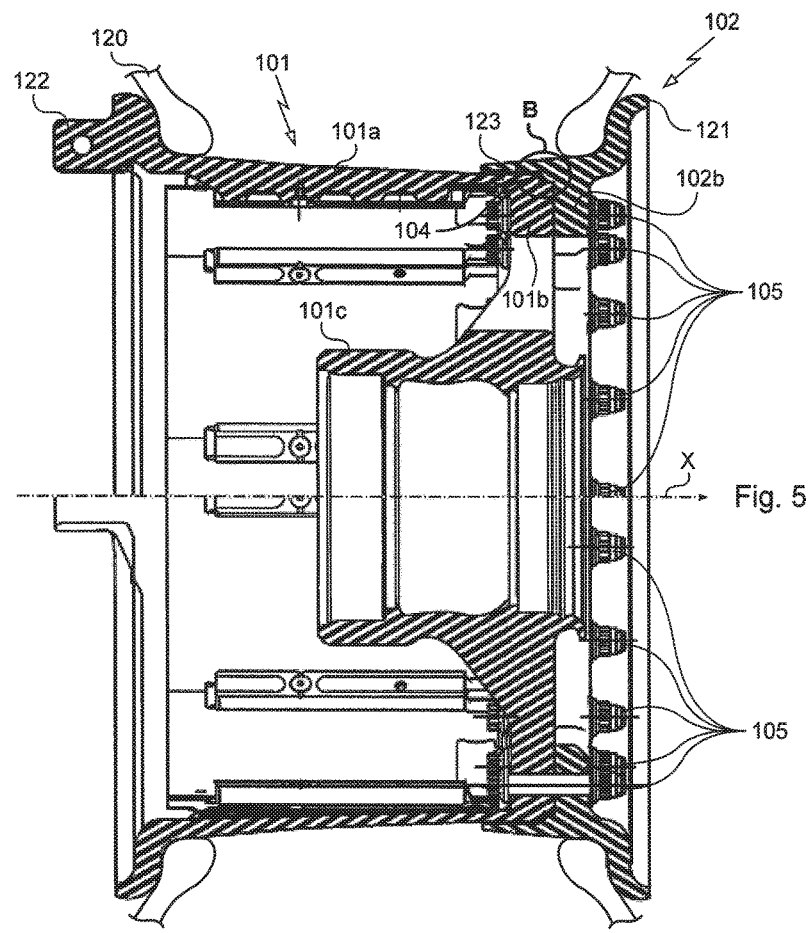
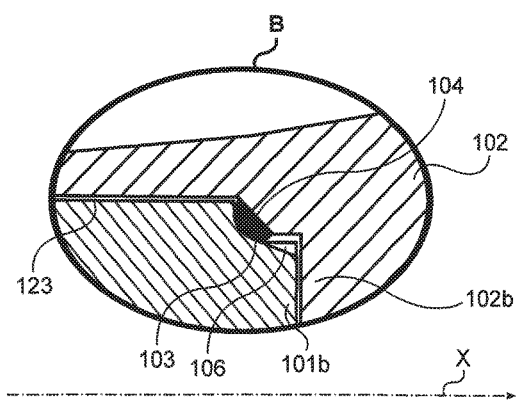
Fig. 5
Fig. 6

AIRCRAFT WHEEL COMPRISING A DUCT ESTABLISHING A LEAKAGE PATH IN THE WHEEL

CROSS-REFERENCE TO RELATED APPLICATIONS

This is a Divisional of U.S. application Ser. No. 14/640,278 filed Mar. 6, 2015, claiming priority based on French Application No. 14 52738 filed Mar. 28, 2014, the contents of all of which are incorporated herein by reference in their entirety.

The invention relates to an aircraft wheel comprising a duct establishing a leakage path in the wheel.

BACKGROUND OF THE INVENTION

Aircraft wheels are known which comprise a rim and a tyre received on the rim, the rim comprising two parts assembled by means of regularly distributed bolts. For example, the rim comprises two half-rims whose webs are pierced so as to receive bolts. Also known are rims, one of the flanges of which is removable and is assembled to the other flange by means of bolts. Typically, such an assembly may require in the region of twenty bolts. To that end, the two parts are pierced with opposing openings able to receive the bolts. Moreover, one of the parts usually comprises a recess in which is arranged a seal which is thus compressed between the two parts in order to ensure the leaktightness of the volume of gas delimited by the rim and the tyre.

However, a bolt may come loose such that the two parts are no longer correctly pressed against one another. Moreover, one of the bolts may be absent. This can cause damage to the wheel.

It proves however difficult to ascertain visually whether said bolt is loose.

OBJECT OF THE INVENTION

The invention has the object of proposing an aircraft wheel by means of which the abovementioned problem can be avoided.

SUMMARY OF THE INVENTION

With a view to achieving this aim, there is proposed an aircraft wheel comprising a rim and a tyre received on the rim, the rim comprising two parts assembled with one another by means of assembly bolts, one of the parts comprising a recess in which is arranged a seal which is interposed between the two parts.

According to the invention, one of the parts comprises at least one duct extending beneath the seal and opening into the recess so as to establish a leakage path between on one hand a volume delimited by the rim and the tyre and on the other hand a space between the parts, the path being nominally closed by the seal when the bolts are tightened correctly but allowing a leakage from said volume to the outside when one of the bolts adjacent to said opening is not tightened correctly or is absent.

Thus, in the event of a loose bolt, the duct makes it possible to cause an intentional leakage of the gas contained in the tyre to outside the wheel, which causes the tyre to deflate rapidly and visibly. It therefore proves simple to ascertain the existence of a problem upon seeing the deflated tyre, which prompts a more detailed investigation of the tightness of the various bolts.

Detecting a problem in the attachment between the two parts of the rim is thus thereby simplified.

Furthermore, the risk of the wheel being damaged by the problem in the attachment between the two parts of the rim is thus limited.

BRIEF DESCRIPTION OF THE DRAWINGS

The invention will be better understood in light of the following description of particular embodiments of the invention, with reference to the figures of the appended drawings, in which:

FIG. 4 is a further enlarged view of the detail A, without the seal and without the half-rim 2a.

FIG. 5 is a view in longitudinal section of an aircraft wheel according to a second embodiment of the invention, in a plane passing through the axis of rotation of the wheel and extending, for half of the figure, through one of the assembly bolts and extending, for half of the figure, between two consecutive assembly bolts.

FIG. 6 is an enlarged view in section of the detail B shown in FIG. 5, an exaggerated space having been shown between the rim parts.

DETAILED DESCRIPTION OF THE INVENTION

Figures 1, 3:
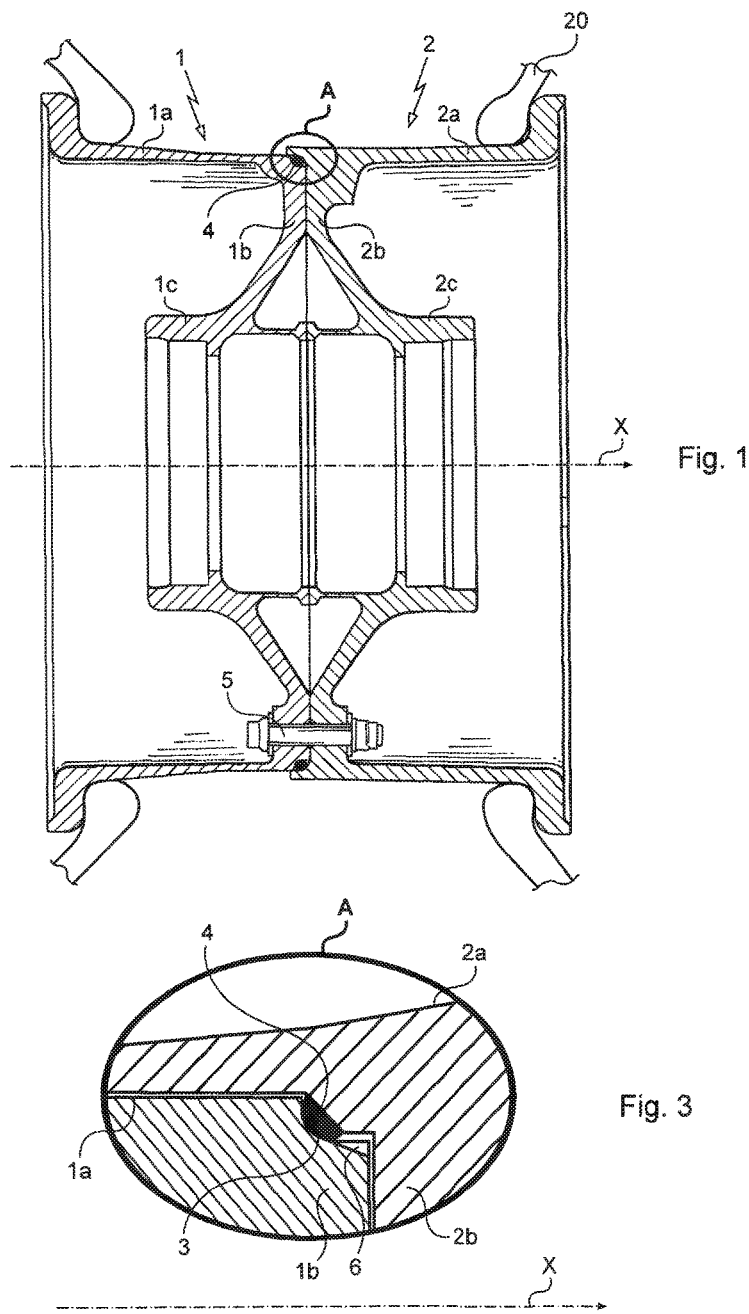
FIG. 1 is a view in longitudinal section of an aircraft wheel according to a first embodiment of the invention.
FIG. 3 is an enlarged view of the detail A shown in FIG. 1, an exaggerated space having been shown between the half-rims.
Figure 2:
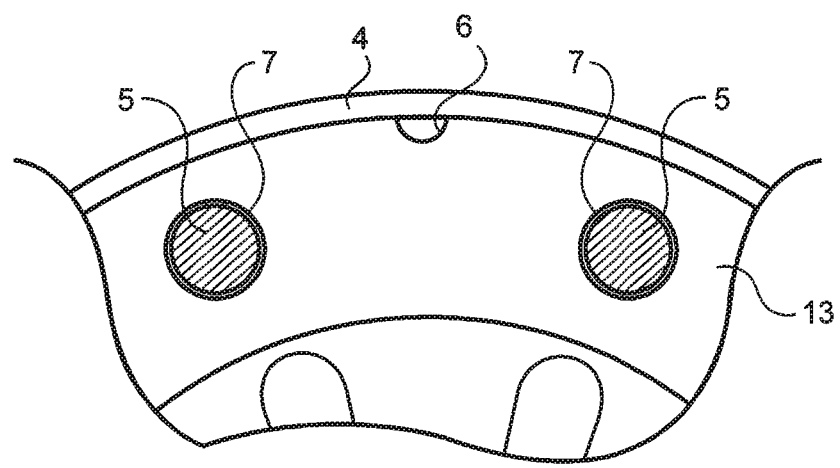
FIG. 2 is a partial front view of the half-rim 1b shown in FIG. 1, showing one of the ducts.

According to a first embodiment, the wheel shown in FIGS. 1 and 2 comprises, in a manner known per se, two half-rims 1, 2 which each comprise a rim portion 1a, 2a, a web 1b, 2b, and a half-hub 1c, 2c. One of the half-rims 1 comprises a recess 3 created in its web 1b and in which is arranged a seal 4.

The half-rims 1, 2 are brought together in a direction parallel to an axis of rotation of the wheel X and comprise centring surfaces to ensure proper relative positioning of the half-rims 1, 2. The half-rims are held in position by assembly bolts 5 arranged in openings 7 pierced opposite one another in the half-rims (only one bolt is shown here, but there are several, typically 4 to 24, regularly distributed).

In a manner known per se, the bolts 5 are screwed in and tightened in order to assemble the two half-rims 1, 2 after mounting a tyre 20 on the rim portions 1a, 1b. In this position, the seal 4 is compressed between the two half-rims 1, 2 and thus prevents the gas contained in a volume delimited by the tyre 20 and the two half-rims 1, 2 from escaping to outside the wheel.

Figure 4:
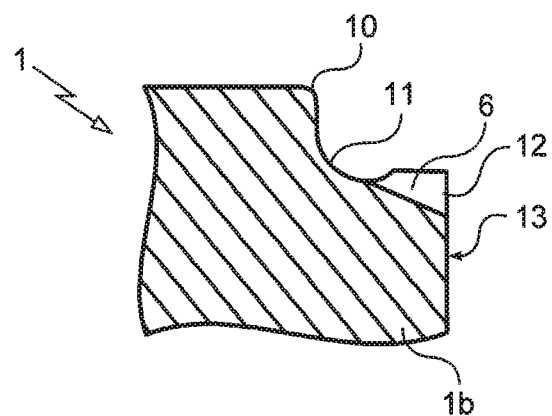

As shown in FIGS. 3 and 4, and in accordance with the invention, the half-rim 1a comprising the recess 3 comprises a plurality of ducts 6 (only one of which is shown in the figures). Each duct 6 extends between two assembly bolts 5 of the wheel. The half-rim 1 therefore comprises as many ducts 6 as bolts 5. Preferably, each duct 6 extends equidistant from the two associated openings 7 in the half-rim 1.

Moreover, each duct 6 extends beneath the seal 4 and opens at one of its ends into the recess 3 and at the other of its ends in the join between the two webs 1b, 2b.

Thus, each duct 6 is arranged so as to establish a leakage path between the volume delimited by the tyre and the outside, passing through the space between the half-rims.

When the bolts 5 are all tightened correctly, these paths are blocked by the seal 4. When one of the bolts 5 is not tightened correctly or is absent, the two half-rims 1, 2 move apart from each other at said bolt 5 such that the seal 4 is no longer correctly compressed by the two half-rims 1, 2 at that point. The seal 4 cannot then prevent the gas from escaping via the leakage path established by the two ducts adjacent to said bolt 5. The tyre deflates, which can be observed by the maintenance teams or by measuring the pressure in the tyre.

With reference to FIG. 4, the half-rim 1 comprising the recess 3 is formed such that the end of its web 1b designed to be opposite the web 2b of the other half-rim 2 comprises successively, in the direction of the axis of rotation of the wheel X towards the other web 2b, a radius 10, a channel 11 here forming the recess 3 and a shoulder 12. Here, the shoulder 12 has a height for example of the order of 0.8 millimeters.

The half-rim 1 is machined by milling at the shoulder 12 so as to locally remove said shoulder 12 at various points in order to form the various ducts 6. Each duct 6 thus formed extends from the channel 11 to the face 13 of the web 1b which is opposite the other web 2b. Here, the duct has a bottom which is inclined with respect to the axis of rotation X and has a maximum depth at the outlet on the face 13 (typically of the order of 2 millimeters).

It thus proves very simple to form the ducts 6 even on already existing half-rims.

With reference to FIGS. 5 and 6, a second embodiment of the invention will now be described. In contrast to the first embodiment, the rim of the aircraft wheel comprises a main part 101 and a removable part 102 forming a flange 121 in place of the two half-rims 1, 2.

The main part 101 comprises, in a manner known per se, a hub 101c, an annular outer portion 101a designed to receive a tyre 120 and formed so as to have a flange 122 at one of its ends, the other of its ends 123 being formed to receive the removable part 102 which is fitted onto the annular outer portion 101a once the tyre 120 is in place. The main part 101 comprises, furthermore, a web 101b extending between the hub 101c and the annular outer portion 101a. Here, the main part 101 comprises a recess 103 created in its web 101b and in which is arranged a seal 104.

The main part 101 and the removable part 102 are brought together in a direction parallel to an axis of rotation of the wheel X and comprise centring surfaces in order to ensure the proper relative positioning of the main part 101 and of the removable part 102. The two parts 101, 102 are held in position by assembly bolts 105 arranged in openings pierced opposite one another in the two parts 101, 102 of the rim.

In a manner known per se, the bolts 105 are screwed in and tightened in order to assemble the two parts 101, 102 once the tyre 120 is mounted on the annular outer portion 101a. In this position, the seal 104 is compressed between the two parts 101, 102 and thus prevents the gas contained in a volume delimited by the tyre 120 and the rim from escaping to outside the wheel.

As shown in FIG. 6, and in accordance with the invention, the main part 101 comprises a plurality of ducts 106 (only one of which is shown in the figures). Each duct 106 extends between two assembly bolts 105 of the wheel. The main part 101 thus comprises as many ducts 106 as bolts. Preferably, each duct 106 extends equidistant from the two associated openings in the main part 101.

Moreover, each duct 106 extends beneath the seal 104 and opens at one of its ends into the recess 103 and at the other of its ends at the join between the web 101b of the main part 101 and a web 102b of the removable part 102.

Thus, each duct 106 is arranged so as to establish a leakage path between the volume delimited by the tyre 120 and the outside, passing via the space between the main part 101 and the removable part 102.

Here, the main part 101 is formed such that the end of its web 101b designed to be opposite the web 102b of the removable part 102 comprises successively, in the direction of the axis of rotation of the wheel X towards the removable part 102, a radius, a channel here forming the recess and a shoulder. Here, the shoulder has for example a height of the order of 0.8 millimeters.

The main part 101 is machined by milling at the shoulder so as to locally remove said shoulder at various points to form the various ducts 106. Each duct 106 thus formed extends from the channel to the face of the web 101b which is opposite the web 102b of the removable part 102. Here, the duct 106 has a bottom which is inclined with respect to the axis of rotation X and has a maximum depth at the outlet on the face of the web 101b which is opposite the web 102b (typically of the order of 2 millimeters).

The invention is not limited to that which has just been described, but on the contrary encompasses any variant within the scope defined by the claims.

Although in the example shown the half-rims each comprise one half-hub, it would of course be possible to envisage any other division, as long as the half-rims are assembled by means of assembly bolts.

The aircraft wheel could comprise a different number of ducts from that indicated.

Of course, the duct could take on a different shape to that shown. Thus, although here the duct has a bottom which is inclined relative to an axis of rotation of the wheel, the duct could have a bottom which is parallel to said axis. The duct could have other dimensions to those described, although the duct must have suitable dimensions so as to avoid the seal collapsing inside the duct when the bolts are tightened correctly, which would impair the leaktightness of the volume of gas. For example, although here the half-rim, or the main part, is machined to a depth of 2.4 millimeters, it would be possible to machine the half-rim, or the main part, to another depth for example a depth between 0.8 and 2.4 millimeters at the face of the part of the rim at the join with the other part of the rim. If the half-rim, or the main part, comprises a shoulder on which the web of the other half-rim, or of the removable part, is designed to rest, the half-rim, or the main part, will be machined so as to locally remove said shoulder entirely. The duct will thus have a smooth inner surface which will make it easier for the gas to escape.

Finally, the duct or ducts may be cut into that one of the half-rims which does not comprise the recess for receiving the seal, provided that these ducts are nominally plugged by the seal when the bolts are correctly tightened. Equally, the duct or ducts may be cut into the removable part which does not comprise the recess for receiving the seal, provided that these ducts are nominally plugged by the seal when the bolts are correctly tightened.

The invention claimed is:

1. An aircraft wheel comprising:
a rim, and a tyre (20; 120) received on the rim,
wherein the rim is in two parts (1, 2; 101, 102) assembled with one another by means of assembly bolts (5; 105), one of the parts comprising a recess (3; 103) in which is arranged a seal (4; 104) which is interposed between the two parts,
wherein at least one of the parts comprises at least one duct (6; 106) extending beneath the seal so as to establish a leakage path between on one hand a volume of gas delimited by the rim and the tyre, and on the other hand a space between the two parts, the path being nominally closed by the seal when the bolts are tightened correctly but allowing gas to leak from said volume when the bolt associated with said opening is not tightened correctly or is absent, wherein the rim comprises two half-rims (1, 2), each half-rim forming respectively one of the parts of the rim, and wherein the duct (6) is cut into the half-rim comprising the recess (3), the duct opening into the recess.

2. The wheel according to claim 1, in which the duct (6) has a bottom which is inclined relative to an axis of rotation (X) of the wheel.

3. The wheel according to claim 1, formed such that the duct (6) opens at one end onto a face (13) of the half-rim (1) opposite the other half-rim (2).

4. The wheel according to claim 1, in which one of the parts comprises a plurality of ducts (6; 106) each extending between two consecutive assembly bolts (5; 105).

* * * * *